United States Patent [19]

Königer et al.

[11] Patent Number: 4,498,271
[45] Date of Patent: Feb. 12, 1985

[54] FIXING ANCHORING BARS OR THE LIKE IN STRUCTURES SUCH AS CONCRETE

[76] Inventors: Rudolf Königer; Kai Königer, both of Spitalackerstr. 21, D-7808 Waldkirch, Fed. Rep. of Germany

[21] Appl. No.: 357,296

[22] Filed: Mar. 11, 1982

[30] Foreign Application Priority Data

Mar. 28, 1981 [DE] Fed. Rep. of Germany ....... 3112421

[51] Int. Cl.³ .............................................. E04B 1/38
[52] U.S. Cl. ...................... 52/707; 52/711; 52/741; 33/174 G
[58] Field of Search ............... 52/27, 285, 584, 57 B, 52/580, 704, 707, 711, 741; 411/82, 166, 176, 177, 427, 432; 33/174 G, 185 R, 197; 408/72 R, 72 B, 97, 115 R, 115 B; 405/260

[56] References Cited

U.S. PATENT DOCUMENTS

| | | | |
|---|---|---|---|
| 1,095,626 | 5/1914 | Dinger et al. | 52/711 |
| 2,409,936 | 10/1946 | Hunt | 408/72 |
| 2,539,223 | 1/1951 | Bellek | 33/185 R |
| 2,648,248 | 8/1953 | Cederquist | 411/427 |
| 2,747,236 | 5/1956 | French | 411/427 |
| 3,064,321 | 11/1962 | Rose | 52/584 |
| 3,192,981 | 7/1965 | Oliver | 411/176 |
| 3,863,975 | 2/1975 | Oldnettel | |
| 4,012,880 | 3/1977 | Logie | 52/584 |

FOREIGN PATENT DOCUMENTS

| | | | |
|---|---|---|---|
| 233328 | 12/1959 | Australia | 52/512 |
| 504917 | 8/1954 | Canada | 405/260 |
| 1913364 | 2/1970 | Fed. Rep. of Germany | 52/706 |
| 2834331 | 2/1980 | Fed. Rep. of Germany | |
| 1117119 | 2/1956 | France | 411/427 |
| 1593581 | 7/1970 | France | |
| 196936 | 4/1938 | Switzerland | 411/427 |
| 411945 | 6/1934 | United Kingdom | 52/155 |
| 829376 | 3/1960 | United Kingdom | 411/427 |

Primary Examiner—James L. Ridgill, Jr.
Attorney, Agent, or Firm—Sandler & Greenblum

[57] ABSTRACT

A method and apparatus is provided for anchoring threaded bars, such as bolts or similar elements, to hardened concrete, cement, or stone. An anchoring hole and a side hole are cut in the solid structure, and a sprag is then positioned within the side hole. The sprag is in the form of a sleeve and has a screw-threaded opening which extends through it and which is adapted to receive a threaded anchoring bar. The angle between the longitudinal axis of the sprag and the opening is equal to the angle between the anchoring bar hole and the side hole which are formed in the structure. The sprag is positioned within the side hole until its threaded opening is in line with the anchoring bar hole, so that the anchoring bar can be screwed into it.

23 Claims, 17 Drawing Figures

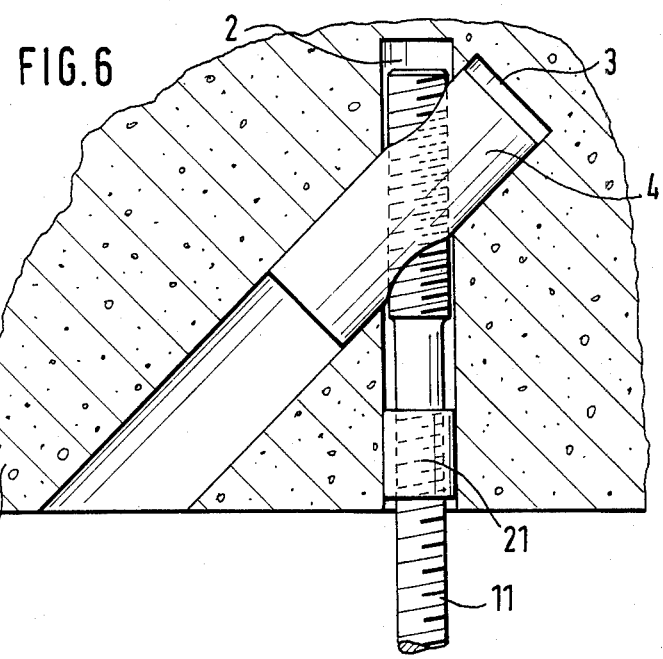
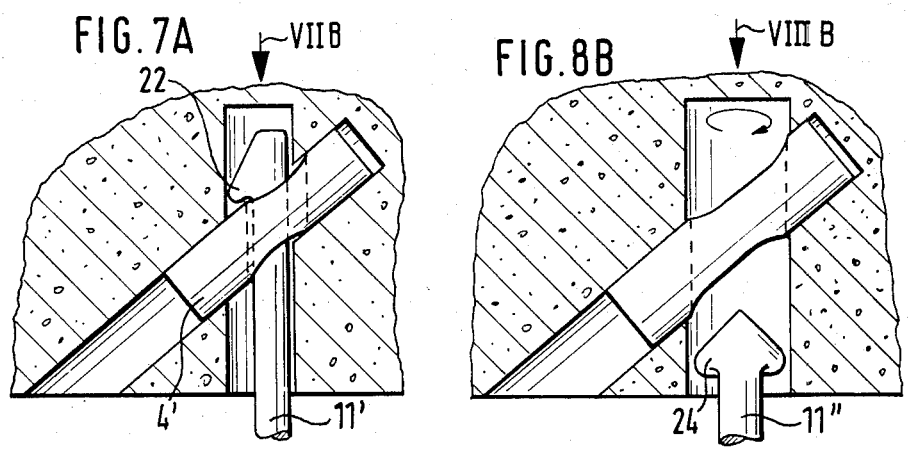
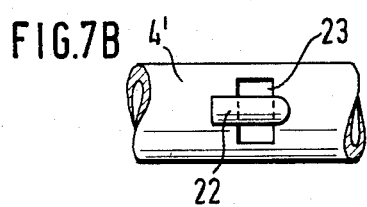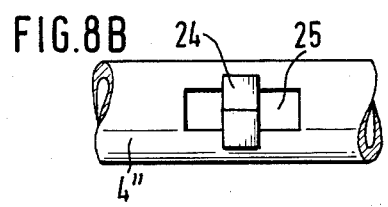

FIXING ANCHORING BARS OR THE LIKE IN STRUCTURES SUCH AS CONCRETE

BACKGROUND OF THE INVENTION

1. Field of the Invention

The invention is with respect to fixing anchoring bars or the like in concrete structures such as concrete floors.

2. Description of the Prior Art

Presently, there are a number of ways in which parts may be anchored in concrete. If it is clear right from the start where anchoring bars or bolts are to be fixed in concrete before the concrete structure is made, the bars, which, at their ends, have a cross-bar or a hook, may simply be cast in place in the concrete. However, it is frequently not possible to see beforehand where such anchors are to be fixed. In such cases, holes for anchors are produced in the concrete floor or wall after curing and then plugs put in the holes so that the threaded rod may be put in each plug. Such plugs are, in the main, plugs of plastic material, kept in position by friction, metal expansion plugs with inner and outer cones, or compound plugs which are fixed in position by adhesive. Although, if plugs of plastic material are used, it is possible for the threaded rod to be unscrewed, such plastic plugs have their shortcomings insafar as slipping is likely if there are changes in temperature, if there is a changing or shock-like load or if the concrete is cracked. Furthermore, on using plastic plugs, gripping forces are necessary in the connection to keep the plug in place. The properties of metal plugs or anchors, when there is a change in temperature or shock-loading or if the concrete becomes cracked (although there is a relatively high degree of slip in the last-named cases) are somewhat better, but in other respects, metal anchors or plugs have the same shortcomings as plastic plugs and furthermore may not be undone. This is furthermore true of adhesively fixed compound plugs, which, although generally not likely to become loose under loads and not responsible for gripping forces, have shortcomings with respect to changes in temperature and cracks in the concrete. Anchoring processes for use in hard concrete and which are completely free of trouble and which give safe connections, for the purpose of anchoring metal bars in croncrete, have not so far been worked out. Safe connections with concrete are, however, necessary. One idea coming to mind would be making the hole in the concrete wider in an inward direction but, however, there is no known way of drilling for readily producing such holes and if at all, it would seem that such holes might only be produced using complex drilling tools which would be able to be slipped in through the narrow mouth of a hole and then be increased in radius within the hole, at least in part, for making the parts of the hole inside the concrete larger in diameter. Such a process might be able to be used, although being very complex, if the holes might be kept clear of reinforcements within the concrete. There would be no certain way of not cutting the reinforcements and if reinforcements were in fact to be cut, the special-purpose drilling tools needed for producing holes becoming wider in an inward direction would be damaged.

SUMMARY OF THE INVENTION

For this reason, one purpose of the present invention is that of designing a process of the sort noted which is simple and free of trouble and makes possible completely safe anchoring. A further purpose of the invention is that of designing an anchoring or fixing element, designed for use in the process and which is in fact best used in the process.

In the invention for effecting one such and further purposes, an anchoring bar hole is produced and at least one side hole is produced cutting through the anchoring bar hole and an anchoring bar is so fixed in position that it is kept in place, against a pulling force, in the anchoring bar hole by a sprag supported against the side walls of the side hole. It has turned out that such a way of anchoring using the process of the present invention is able to keep to all necessary conditions in respect of such anchoring structures and in fact it will readily be seen that changes in temperature have no effect on the anchoring system which, as has been seen as well, is in no way damaged by dynamic and shock-loads. The anchoring system of the present invention makes possible a connection with the structure (in which the holes are made) which is free of any strains, when the anchoring bar is not acted upon by any forces. Furthermore, the complete system may be taken to pieces and taken from the structure. On the development of any crack in the concrete, there will be no, or at the most, only a small amount of slip which is small in relation to slip in known anchoring systems.

As far as possible, on making use of the invention, it is best for the two holes to be made starting from the same side of the concrete. In this case, as a further preferred part of the present invention, after producing the anchoring bar hole, a unit is fixed by way of the anchoring bar hole to the concrete, such unit having a guide with the direction of the side hole so that the same may be produced using the unit, or, as a further possible form of the invention, the two holes are made using a unit having guide holes therein and with a drill fixed thereto.

As part of a further preferred form of the invention, it is possible for the two holes to be so exactly produced in relation to each other that the axes come together at a single point so that the anchoring operation may be undertaken readily and exactly. For such exact drilling operations, an apparatus for producing holes in concrete or the like has, in the present invention, as least one drill and is characterized in the a unit, as for example a plate, with at least one hole is used, such hole being at an acute angle to a line normal to the side of the plate which is to be rested against the concrete and takes the form of a sloping guide sleeve for a drill bit, the unit being so designed that at least one drill may be fixed to it in such a way that its drill bit may be run through the sloping opening. The apparatus may be furthermore designed, as a preferred part of the invention, in such a way that a second drill may be joined up with the unit so that it is normal to the side of the unit to be rested against the concrete, or the apparatus may be so designed that a screw may be run into a guide hole in the unit and so fixed in position in a concrete wall or other structure that the unit may be turned round the screw.

It will be seen from this that in the first case two drills are joined up with a plate and the holes are produced in any desired order one after the other. In the second case, without first using the plate, the anchoring bar hole is first produced using a normal drill so as to be normal to the outer face of the concrete structure and then the plate is fixed in position using a fixing screw or the like in the anchoring bar hole, whereafter the drill fixed to the plate is used for producing the side hole. The opening in the plate having the fixing screw running therethrough and the guide opening in the plate for the drill bit of the drill for the side opening are, in this respect, so lined up that the side hole and the anchoring bar hole come together in the middle.

The last-noted form of the invention gives the useful effect that the plate may be turned through 360° round the axis of the anchoring bar hole and, for this reason, if on producing the side hole the drill bit comes up against a reinforcement in the concrete, the plate may readily be turned somewhat so that the reinforcement(s) does not have to be drilled through. As a general point, however, the plates of the apparatus may be fixed in position by suction, by wall plugs or by expansion structures so that such plates are kept strongly in position against the concrete.

A further working example of the invention using two drills on a single plate is characterized in that the second drill is, as well, guided through a guide opening or hole in the unit, the openings, used as guide sleeves for the two drills, are so lined up that the holes come together in the middle. In order to be certain of taking up the sideways forces produced on drilling and to be quite certain of guiding the drilling bits as desired, there is a further development of the invention in which the drill is kept in position by a fixing part with two supports, such supports being lined up with the drill on the one hand and with the drill bit on the other. Even although, as a general teaching of the invention, the side hole may be produced so as to be at a right angle to the anchoring bar hole, for example on working at the edges or ends of concrete slabs, it is best, that is to say as part of a preferred form of the invention, for the side hole to be produced at an acute angle of more specially more than 45° to the anchoring bar hole, the two holes running from the same outer face of the concrete thereinto. By having a generally large, but still acute, angle between the holes, the amount of slip likely on cracking of the concrete is kept down. Even although it is possible to make use of a known screw fixing plug with turning support arms, such as a toggle or expansion wall plug, more specially one made of metal, which is pushed into the anchoring bar hole till the support arms are in the side hole or if a bayonet connection is used between the anchoring bar and the sprag and it is furthermore possible for the anchoring bar to have a hook or locking bolt, a very useful effect is produced if the sprag is in the form of a generally cylindrical part with a hole running through it from side to side at the angle between the anchoring bar hole and the side hole, such hole in the sprag having a female thread, the sprag being moved into the side hole till its female thread is generally in line with the anchoring bar hole ready for the male-threaded anchoring bar to be screwed into it. The cylindrical part may be a generally solid part with holes of the right design therein, such as threaded holes, or it may be in the form of a hollow sleeve. In the process of the invention, the holes are produced with diamond tipped drill bits so that the holes may be produced very exactly, something which is necessary to see that the second hole produced does in fact go throught the first one produced, the lengthways axes of the holes coming together at a point, that is to say cutting each other. A sprag designed for use in the process of the invention is characterized by a generally cylindrical part with an opening therethrough from one side to the other, the direction of such sideways opening making an acute angle with the lengthways axis of the sprag and having a female screw-thread.

As part of a preferred development of the process of the invention, after screwing the anchoring bar into the sprag, the bar is fixed in the cylindrical sprag using the side hole. This operation may be undertaken in such a way, for example, by adhesively fixing the anchoring bar in the cylindrical part. However, as a preferred part of the invention, the screw-thread of the anchoring bar may be dented by a tool put in through an axial opening in the cylindrical part, such axial opening stretching from one end of the generally cylindrical part as far as the opening, running from one side of the sprag to the other, with a female-thread. In this case, the tool, as for example a pointed punch, is moved in through the axial opening as far as the thread of the anchoring bar, the other end of the punch running out clear of the side opening so that it may be hammered against for producing a dent in the thread of the anchoring bar. Such denting takes effect on the screw-thread so that the anchoring bar may not be unscrewed. As part of a preferred working example of the anchoring sprag of the present invention, the generally cylindrical part has at at least one end thereof (that is to say the end pointing outwards when the cylindrical part is put in position) a number of flats in a hole or on a nut for use with a tool, such flats in the hole or on the nut being more specially one-sided so that, more specially, the flats within a socket or on a nut are such that a male or female tool, having matching flats, may only be put on in one position of angle. If then the part of the tool, which is outside of the hole when the tool is in position, has a mark or pointer, the cylindrical part may be readily lined up after being put in position, using the tool so that the threaded opening therein is in line with the anchoring bar hole and so that the anchoring bar may then be readily screwed into position in the sprag. Moreover, to make it possible for the worker to put the cylindrical part at the right position within the side hole, that is to say so that the threaded opening is trued up with the anchoring bar hole, the tool may have a stop plate thereon placed at the right angle in relation thereto. With this stop plate, the tool may only be pushed into the side hole as far as the stop plate which will then be rested flatly against the concrete wall with the holes. In systems in which there is a screw-thread at the inner end of the anchoring sprag, it is possible for the cylindrical anchoring part or sprag to be put in line by having a given number of turns of the thread in the sprag bar with a thread start in a given position in relation to the end of the threaded opening nearest to the end of the anchoring sprag. A further point to be noted is that, although the anchoring bar may be fully threaded from end to end, the threads may be limited to its inner and possibly outer ends, the part inbetween being plain and unthreaded.

BRIEF DESCRIPTION OF THE DRAWINGS

Further useful effects, and details of the invention will be seen from the claims and the account now to be given of working examples using the figures.

FIG. 6 is a view of an anchoring system like that to be seen in FIG. 1f, the anchoring bar being positioned by way of a sleeve for taking up sideways forces.

FIGS. 7a, 7b, 8a and 8b are sections through different anchoring systems using an anchoring bar with, in the one case, a hooked head and, in the other case, a bolt head, FIGS. 7b and 8b being on the section lines as marked in FIGS. 7a and 8a.

DESCRIPTION OF THE PREFERRED EMBODIMENTS

In a concrete floor 1, for example, on which a steel bar or the like is to be fixed in position, the first step is drilling an anchoring bar hole 2 which, in the working example of FIG. 1, to be seen to be stretching in an upright direction from the lower face of the floor 1 thereinto. Nextly, a side hole 3 is produced starting at a point some distance from the outer end of anchoring bar hole 2 and at an angle α thereto (which will generally be less than 90°) for cutting through anchoring bar hole 2. To keep these holes true diamond tipped drill bits (and not impact bits) will be used.

In the next stage of the process (see FIG. 1c) a sprag 4 or anchoring part is slipped into side hole 3.

Figure 1A:
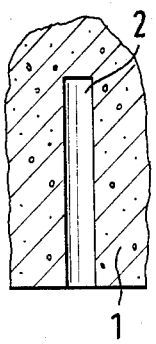
FIGS. 1a to 1f make clear the different stages of fixing an anchoring bar in position with the process of the invention.
Figure 1B:
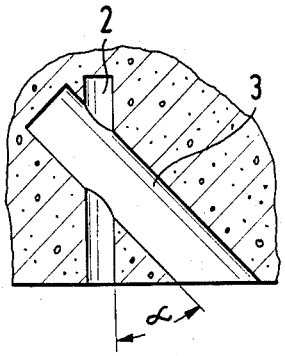
Figure 1C:
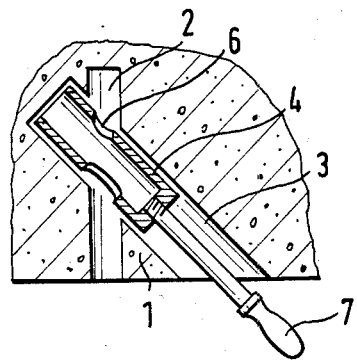
Figure 1D:
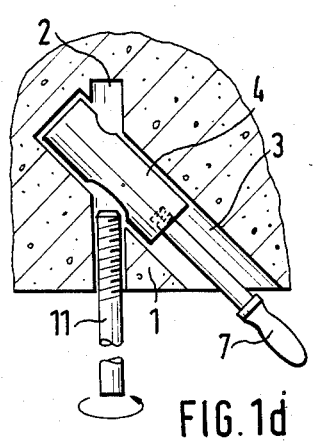
Figure 1E:
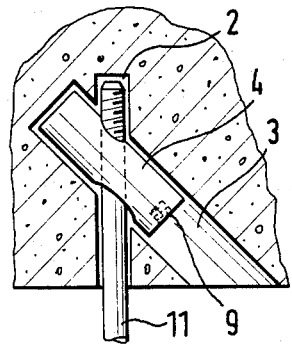
Figure 1F:
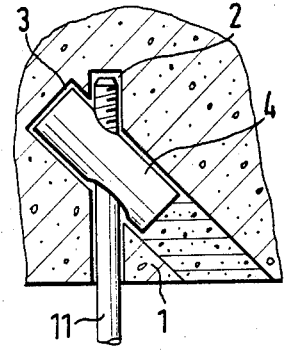
Figure 2:
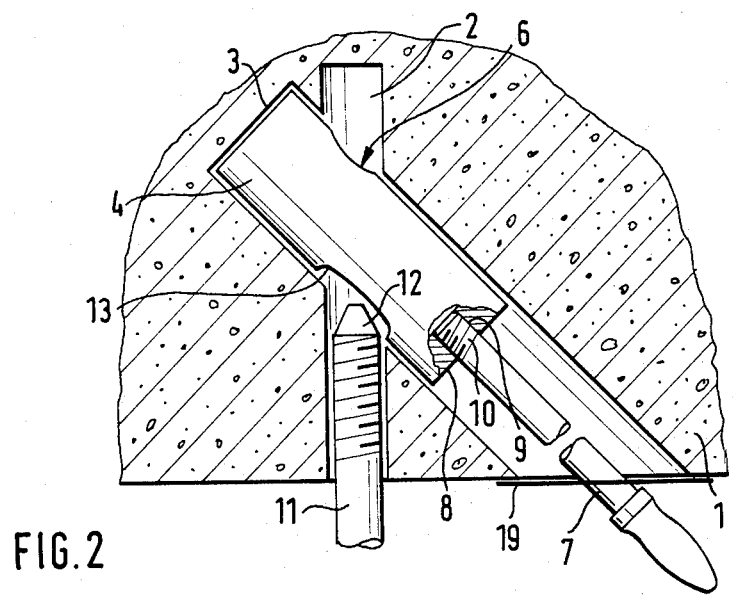
FIG. 2 is a view on a greater scale of the stage of FIG. 1d to make clear the anchoring bar of the invention.

Sprag 4 will be seen somewhat more clearly in FIG. 2. The sprag 4 is in the present case a sleeve, more specially a cylindrical one, with an opening 6 running therethrough. However, for meeting special needs, the sprag may be made solid and not in the form of a hollow sleeve.

Using a keeper tool 7, the sprag 4 or sleeve is pushed from the outside into and along the side hole till the opening 6 is trued up with the anchoring bar hole 2. The sleeve 4 has a hole 9 with a female-thread in its one end 8 for taking up keeper tool 7. The female screw-thread of sleeve 4 will have. in each case, a certain number of turns of thread, as for example 2½.Furthermore, the start of the thread in hole 9 has a certain relation to the end (nearer to the end 8) of the opening 6 through the sprag 4 so that, when the tool 7 is screwed as far as it will go into the sprag, it will always have the same position or the same angle in relation to the threaded opening 6. If, furthermore, as is the case in FIG. 2, a stop plate 19 is fixed at a given distance from the end of tool 7 to the same at an angle the same as the angle between the side hole and the anchoring bar hole, it will be possible for the worker to be certain of getting the sleeve 4 to the right depth in the side hole 2 by using tool 7, that is to say so that the opening 6 is trued up with the anchoring bar hole 2 and the anchoring bar 11 itself may be screwed home without any trouble at all. In place of this design, it will be possible, however, to have an allen-key or hex socket in the end 8 of sleeve 4, or to have a hex nut thereon for use with a matching end piece of keeper tool 7. Instead of using regular hex sockets or hex nuts, one-sided sockets or nuts may be used such that the tool 7 may only be joined up with the sprag or sleeve 4 with a certain angle between the two so that, given the right design of the tool 7, there will be no trouble at all in putting the sprag into the side hole at such an angle that the sideways opening 6 of sleeve 4 is lined up with the anchoring bar hole 2.

After pushing the sprag or sleeve 4 in through the side hole 3 till the threaded opening 6 therein is lined up with the anchoring bar hole 2, the anchoring bar 11 itself is slipped in and screwed home in the sprag.

To make it simpler for the threaded anchoring bar 11 to be lined up with and screwed into the threaded opening in sleeve 4, threaded anchoring bar 11 is pointed at 12 at its head end and furthermore at least one end 13 of the opening through the sleeve-like sprag 4 is made wider so that if sprag 4 does not have its opening 6 completely lined up with anchoring bar hole 2, on pushing in the threaded bar 11, the sprag 4 and the threaded bar 11 will be moved into a position in relation to each other.

The threaded bar 11, which for example may be a screw with a screwhead 16 (see FIG. 4), will be screwed home till a part to be fixed by it (for example a rail 17 in FIG. 4) is positioned on the concrete floor 1. Then tool 7 is undone from sprag 4, that is to say, in the working example of FIG. 2, the tool 7 is turned so that its threaded end 10 is unscrewed from the threaded hole 9. It is naturally possible for tool 7 to be undone and taken out without waiting for threaded bar 11 to be screwed fully into screw-threaded opening 6, because even after the bar has been screwed in only a bit, sprag 4 is kept in position, there being no chance of it falling out.

The anchoring system of the invention may be seen from this to be made up of two anchoring parts, that is to say on the one hand the screw-threaded anchoring bar 11, on whose tail end, sticking out out of the hole 2, the load is fixed, and the sprag 4, which is locked in and by the side hole 3 and has the effect of locking or anchoring anchoring bar 11 in position. As has been noted, sprag 4 is kept in the right position with the help of tool 7 while the two anchoring parts are being joined together.

After the screw-threaded anchoring bar 11 has been screwed into sprag or sleeve 4, it may furthermore be locked in place, for example by forcing adhesive or sealant through side hole 3, threaded hole 9 in the end 8 of sleeve 4 and into the inside of the sleeve so that the threaded bar 11 is then adhesively locked in the sprag 4. It is furthermore possible for a center-punch-like tool to be slipped in through hole 9 till it is resting against the thread of threaded bar 11 and, using one or two hammer blows on the outwardly running end of the punch-like tool, the thread of anchoring bar 11 is then dented so that it may no longer be unscrewed from sprag 4. The screw-threaded bar 11 may furthermore be locked in sprag 4 and stopped from being unscrewed therefrom by screwing a screw into threaded hole 9 till its head end comes up against the thread of anchoring bar 11 for fixing the threaded bar 11 in position.

Lastly, it is possible (see FIG. 1f) for the side hole 2 to be filled up again, for example with concrete.

Although the process of the invention may be used with good effect with a sprag in the form of a hollow sleeve 4 as the best form of anchoring stop, the sprag may furthermore be in the form of a masonry plug, through which the screw-threaded bar 11 is screwed, the plug being for example in the form of a toggle anchor or expansion anchor, more specially a metal expansion anchor.

Figure 3:
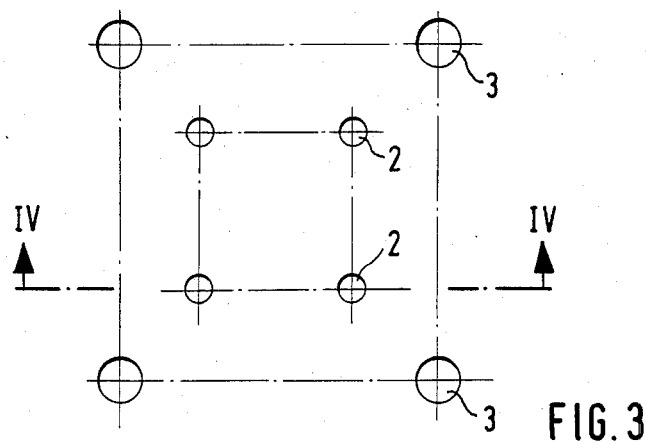
FIG. 3 is a view looking towards four positions for fixing a rail in position.
Figure 4:
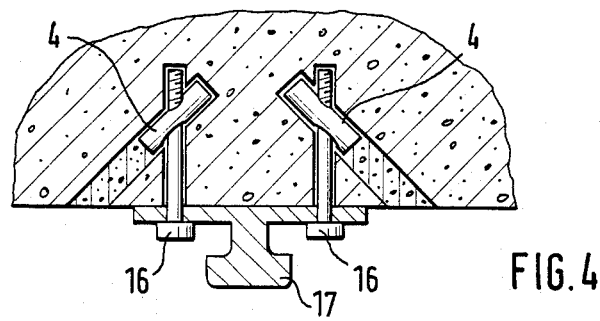
FIG. 4 is a section on the line IV—IV of FIG. 3 with the rail fixed in position.

The working example of the invention to be seen in FIGS. 3 and 4 is in connection with fixing a rail, for example for supporting a crane or the like, to which end an anchoring bar hole 2 and then the side hole 3 are produced using for example a drill press having its baseplate fixed in position. After drilling the anchoring bar hole 2, the drill supporting arm is changed in position or turned and then placed at an angle for drilling the sloping side hole, for producing, in this way, all the fixing or anchoring points to be seen in FIG. 3. A rail 17 is then fixed in position using screws run into the anchoring sprags or sleeves 4 (see FIG. 4).

Figure 5:
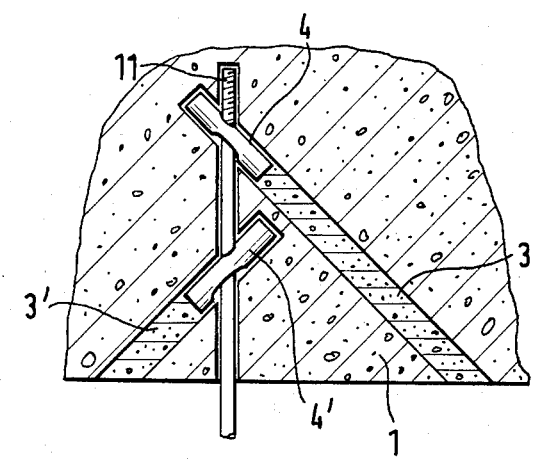
FIG. 5 is a view of a working example of the invention for high loads.

FIG. 5 is a view of a preferred way of fixing a threaded bar 11 in the invention, for which purpose two side holes 3 and 3' are produced cutting, at different points, the anchoring bar hole, so that separate anchoring sleeves 4 and 4' may be slipped into the side holes for the screw-threaded bar 11 to be screwed therethrough keeping them in position, this being a further way of anchoring a threaded bar 11 in position.

FIG. 6 is a view of an anchoring system with a better way of guiding and positioning anchoring bar 11. The step of positioning bar 11 is undertaken in connection with one of the steps 1d and 1e or thereafter. It may be necessary to have a certain amount of play between the anchoring bar 11 and the side of the anchoring hole 2 so that the anchoring bar 11 may be put in position. Such play is, however, undesired when the anchoring bar is loaded, for example not axially but sideways with a shearing effect. For cutting down this undesired play it will be seen that in the working example of FIG. 6 a metal sleeve 21 is slipped into the anchoring bar hole at least so far that the sleeve 21 is completely within the hole and no longer running out past the outer face of concrete 1. The sleeve 21 is best put in position after slipping in the anchoring bar and before the first and second turns on the bar 11 on screwing it into the sprag 4. Because of the presence of metal spacer guide sleeve 21, the play between the wall of the hole 2 and the outer face of anchoring bar 11 is greatly decreased.

So far the figures have been limited for cases in which the anchoring bar 11 is screwed into the anchoring sleeve or sprag 4. Although this is in fact the more specially preferred form of the invention, it would, generally speaking, be possible to have different forms of connection between the anchoring sprag and the anchoring bar, as for example using a bayonet connection or by using hooks or bolts or like stops on the anchoring bar locking into the opening in the anchoring sprag or sleeve. In FIG. 7a the reader will see an anchoring bar 11' having a hooked head 22. The opening 23 in sprag 4' is not round but is broader in a direction running across the sprag 4' than it is in a direction measured along the length of sprag 4'. For slipping in anchoring bar 11', the hooked head 22 is turned so as to be across the general direction of sprag 4' so that it may be pushed through opening 23 and once it is completely through it, the anchoring bar 11' is turned through 90° so that the hooked head 22 is hooked round the wall of opening 23 of sprag 4' as will be seen in FIG. 7a.

In place of this, the anchoring bar 11'' of FIG. 8a may have a hammer head, that is to say hooks 24 on its two sides. In this case the opening 25 in the anchoring sleeve or sprag 4'' is placed so as to be lined up parallel with the general direction of sprag 4'. Anchoring bar 11'' with its hooks 24 is then slipped in the way to be seen in FIG. 8b into and through sprag 4'' in its opening 25 and then, again, turned through 90° so that hooks 24 forming a bolt are normal to the general run or direction of opening 25 and sprag 4'' and will be rested against the wall of opening 25. This makes it clear that there is a further way of producing a trouble-free anchoring connection of the anchoring bar, it being possible in the two designs, that is to say in FIGS. 7a and 8a, to have lock nuts on the anchoring bar resting against the face of the concrete.

On producing the anchoring bar hole 2 and the side hole 3, it is important to see that the two holes are produced completely true with the axis 26 of the side hole as far as possible cutting axis 27 of the anchoring bar hole 2 and meeting it at a point. To make this readily possible without any trouble, the apparatus to be seen in FIGS. 9 and 10 may be used, the same forming part of the present invention.

Figure 9:
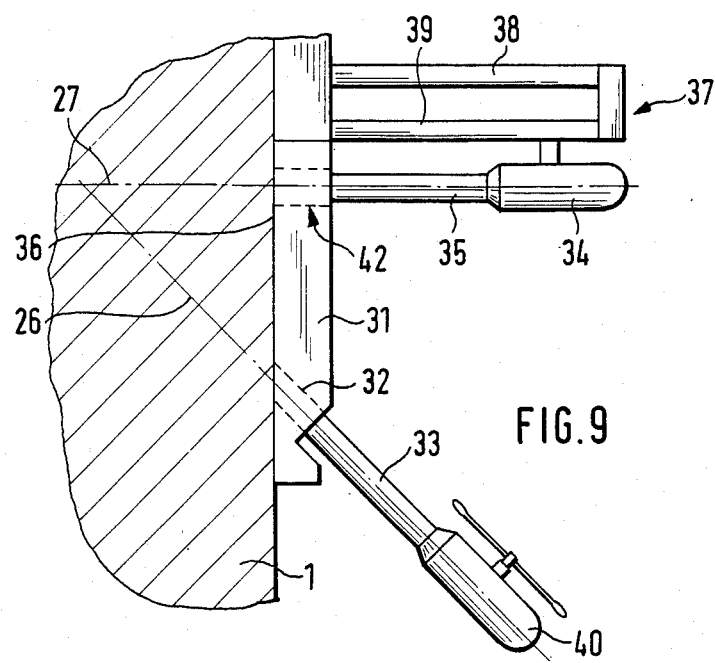
FIG. 9 is a diagrammatic view of a template for producing an anchoring bar hole and a side hole.

The most important part of the apparatus for producing holes in concrete is a plate 31 which, on the one hand may be put in position with a template function for producing the holes and, on the other hand, has an opening or hole 32, used for guiding a drill bit 33 to make certain that the hole produced thereby will in fact be cut through anchoring bar hole with axis 27. In FIG. 9 a drill 34 with a drill bit 35 will be seen to be supported on plate 31 in such a way that drill bit 35 and, for this reason, the axis 27 of the anchoring bar hole to be produced, is normal to the working face 36 of plate 31, that is to say the face placed against the face of the concrete. Drill 34 is joined up with plate 31 by way of a drill press 37 which, like the drill 34 itself may, generally speaking, be of normal design and for example have a support rod as part of the press for supporting the drill. However, for stopping any sideways motion, drill press 37 to be seen in FIG. 9 has two support rods 38 and 39 lined up with drill 35 so that they may take up drilling forces in the best possible way. The use of two support rods 38 and 39 in the drill press 37 for drill 34 gives a strong structure which is better than using a single support rod.

Figure 10:
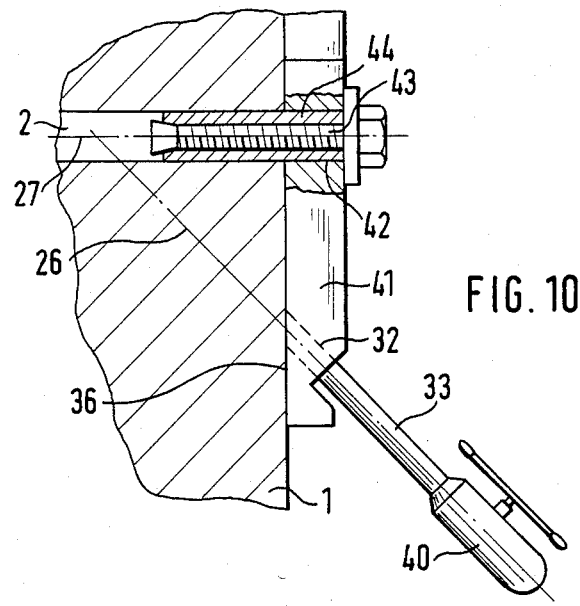
FIG. 10 is a diagrammatic view of an other form of the template for producing anchoring bar holes and side holes.

A further drill bit 33 is used with a drill 40 which may be fixed in more or less the same way as drill 34 on support plate 31 so that no details are given in this respect to make FIGS. 9 and 10 clearer. Plate 31 may be fixed to the concrete wall 1 by vacuum suckers, by wall anchors or may have parts locking in holes in the concrete. The template system for producing the holes, see FIG. 9, makes certain that the anchoring bar hole and the side hole are produced truly with their axes 26, 27 cutting and meeting at a single point so that a strong anchoring system may be produced.

On using the apparatus of FIG. 9 for producing holes, it may be that one hole or the other comes up against a reinforcement in the concrete. In order to better take into account such reinforcements while at the same time making quite certain that the anchoring hole and the side hole are truly lined up, the further working example of the invention of FIG. 10 for producing holes 42 makes do with one drill 40 with a drill bit 33, which, once again, is guided by a sleeve 32 through the plate. Drill 40 may be fixed to plate 41 in the way to be seen in FIG. 9. In place of drill 34 the plate 41 only has one opening 42 which is normal to the working face 36 resting on the concrete 1, of the plate. A screw 43 is slipped in through opening 42 and into an expansion anchor 44, with which the plate 41 is fixed using a hole 2 in the concrete. For producing the holes, the first step is producing the anchoring hole 2, which is normal to the face of the concrete wall 1. Then plate 41 is fixed in position using screws and the expansion sleeve on concrete wall 1 and after this, using drill 34 and drill bit 33, the side hole is produced having an axis 26, drilling bit 33 being guided through the opening 32 in plate 41. On the drill bit running against reinforcements in the concrete, screw 43 may be undone somewhat and plate 41 turned round screw 43, that is to say the axis 27 of the anchoring hole 2 so that the worker may have another go at producing the side hole using drill bit 33 so as to keep clear of reinforcements. This part of the invention is in fact a simple way of producing holes without damaging the reinforcements.

We claim:

1. Apparatus for use in attaching an anchoring bar to a hardened concrete, cement, stone, or similar structure having an outer face, and anchoring bar and side holes intersecting at a predetermined angle, said apparatus comprising a sprag positioned within said side hole and comprising means for taking up a pulling force acting along an anchoring bar positioned within said anchoring bar hole, said sprag being supported against said outer face and having a generally cylindrical portion with an internally threaded opening extending through it, said opening being angled with respect to the longitudinal axis of said sprag at an angle which is substantially equal to said predetermined angle, said sprag opening being generally aligned with said anchoring bar hole and with said anchoring bar when said anchoring bar is inserted within said anchoring bar hole, said anchoring bar being threaded and being screwed within said threaded opening when inserted within said anchoring bar hole.

2. Apparatus in accordance with claim 1 further comprising a sleeve with a thread which is positioned within said side opening.

3. Apparatus in accordance with claim 1, said sprag opening having an outwardly flared portion.

4. Apparatus in accordance with claim 1 wherein said anchoring sprag is substantially solid.

5. Apparatus in accordance with claim 4 wherein said anchoring sprag comprises a sleeve.

6. Apparatus in accordance with claim 1 wherein said sprag comprises a socket at one end, said socket comprising means for receiving a tool for turning said sprag.

7. Apparatus in accordance with claim 6, said sprag further comprising a nut adapted for use with said tool.

8. Apparatus in accordance with claim 7, said sprag comprising a screw thread at at least one end thereof which is adapted to facilitate attachment of said sprag to said tool.

9. A process for attaching an anchoring bar to a hardened structure of concrete, cement, stone, or similar material, said process comprising:
   (a) cutting an anchoring bar hole in said structure into which an anchoring bar is adapted to be inserted;
   (b) forming a side hole in said structure which intersects said anchoring bar hole at a predetermined angle, said side hole being formed after said anchoring bar hole by attaching a template to said structure and by inserting a tool through said template and into said structure to form said side hole;
   (c) positioning a generally cylindrical sprag within said side hole so that said sprag will take up a pulling force which will act along said anchoring bar when said anchoring bar is positioned within said anchoring bar hole, said sprag having a threaded opening therein which is angled with respect to the longitudinal axis of said sprag at an angle which is equal to said predetermined angle between said anchoring bar hole and said side hole, said sprag being positioned within said side hole so as to align said sprag opening with said anchoring bar hole; and
   (d) screwing an anchoring bar having a threaded portion into said threaded sprag opening.

10. A process as defined by claim 9, further comprising using a tool adapted to be gripped by a user at a point exterior of said structure to retain said sprag in a given position while said anchoring bar is being screwed into said sprag.

11. A process as defined by claim 9, wherein said anchoring bar is attached to said sprag by a tool which is positioned within said side hole.

12. A process as defined by claim 9, further comprising adhesively bonding said anchoring bar to said sprag.

13. A process as defined by claim 9, further comprising placing a tool within said side hole and through one end of said generally cylindrical sprag, and then deforming an end of said anchoring bar to lock said anchoring bar in said sprag.

14. A process as defined by claim 9, further comprising locking said anchoring bar by attaching a fixing screw through the thread of said cylindrical sprag, said fixing screw being inserted within the sprag opening.

15. A process as defined by claim 9 wherein said side hole is formed to have a greater diameter than said anchoring bar hole.

16. A process as defined by claim 9 further comprising positioning a spacer sleeve over said anchoring bar within said anchoring bar hole.

17. A process as defined by claim 9, wherein both of said holes are cut in a single side of said structure by using said template, said template having guide openings for receiving said tool.

18. A process as defined by claim 17, wherein said side hole is cut at an acute angle greater than 45° with respect to said anchoring bar hole.

19. A process as defined by claim 17 wherein said tool comprises a drill with a drill bit, said drill also being used to form said anchoring bar hole.

20. A process as defined by claim 19 wherein said drill bits are diamond tipped.

21. Apparatus for producing holes in a hardened structure of cement, concrete, stone, or similar material, said apparatus comprising a template with means for attaching said template to an outer face of said structure, said template comprising at least one opening positioned at an acute angle with respect to a line which is normal to said outer face, said opening comprising a sloping sleeve for receiving a drill bit, said template thereby comprising means for supporting at least one drill so that said drill bit can be moved through said opening, said apparatus further comprising a first drill.

22. An apparatus in accordance with claim 21 further comprising a second drill which has a drill bit adapted to be positioned in a second opening of said template in a direction which is normal to said outer face, said second opening comprising means for guiding said second drill.

23. An apparatus in accordance with claim 21 wherein said means for attaching said template to said structure comprises a screw adapted to be positioned in a hole within said template.

* * * * *